US012566908B2

(12) United States Patent
Kurtz et al.

(10) Patent No.: US 12,566,908 B2
(45) Date of Patent: Mar. 3, 2026

(54) SINGLE CORNER MIXED VOLTAGE NOISE IMPACT ON FUNCTION ANALYSIS

(71) Applicant: International Business Machines Corporation, Armonk, NY (US)

(72) Inventors: Steven Joseph Kurtz, Austin, TX (US); Michael Henry Sitko, Jericho, VT (US); Rahul M. Rao, Bangalore (IN); Sanjay Upreti, Lexington, KY (US); Ajith Kumar Madathil Chandrasekaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 17/934,239

(22) Filed: Sep. 22, 2022

(65) Prior Publication Data

US 2024/0104277 A1     Mar. 28, 2024

(51) Int. Cl.
 G06F 30/327     (2020.01)
 G06F 30/337     (2020.01)
 G06F 119/02     (2020.01)
 G06F 119/10     (2020.01)

(52) U.S. Cl.
 CPC .......... G06F 30/327 (2020.01); G06F 30/337 (2020.01); G06F 2119/02 (2020.01); G06F 2119/10 (2020.01)

(58) Field of Classification Search
 CPC .... G06F 30/327; G06F 30/337; G06F 30/367; G06F 2119/02; G06F 2119/10
 See application file for complete search history.

(56) References Cited

U.S. PATENT DOCUMENTS

| | | | |
|---|---|---|---|
| 8,719,751 | B1 | 5/2014 | Fender |
| 9,003,342 | B1 | 4/2015 | Keller et al. |
| 9,189,584 | B2 | 11/2015 | Feldmann et al. |
| 10,565,336 | B2 | 2/2020 | Morsey et al. |
| 10,845,471 | B2 | 11/2020 | Simard-Bilodeau et al. |
| 11,017,137 | B2 | 5/2021 | Peddawad et al. |
| 11,023,636 | B1 | 6/2021 | Keller et al. |
| 11,176,301 | B2 | 11/2021 | Neves et al. |
| 2002/0188577 | A1 | 12/2002 | Vidhani et al. |
| 2008/0163145 | A1 | 7/2008 | Zarkesh-Ha et al. |

(Continued)

OTHER PUBLICATIONS

Ravikishore Gandikota et al., "Worst-Case Aggressor-Victim Alignment with Current-Source Driver Models," DAC'09, Dated: Jul. 26-31, 2009, pp. 13-18.

(Continued)

*Primary Examiner* — Jack Chiang
*Assistant Examiner* — Aric Lin
(74) *Attorney, Agent, or Firm* — Patterson + Sheridan, LLP

(57) ABSTRACT

A method, system, and computer program product are disclosed for implementing enhanced noise impact on function (NIOF) analysis of an IC design having nets in multiple different variable voltage domains next to each other and modeling all multiple worst-case victim-aggressor voltage configurations in a single run leveraging noise abstracts characterized at a single voltage corner. The NIOF analysis enables accurately identifying incorrect victim switching or functional fails, effectively and efficiently providing design verification and the ability to sign-off an IC design with a single run, and enable modifying an integrated circuit design to fix NIOF failures, and fabricating an integrated circuit.

20 Claims, 6 Drawing Sheets

300

FOR EACH VICTIM NET     302

IDENTIFY VICTIM SUPPLY DOMAIN & VMIN     304

DETERMINE VOLTAGE SCALING FACTOR VSF TO SCALE VMIN TO EQUAL CHARACTERIZED VOLTAGE CV     306

IDENTIFY POTENTIAL AGGRESSORS COUPLED TO VICTIM NET     308

FOR EACH IDENTIFIED AGGRESSOR     310

IDENTIFY AGGRESSOR SUPPLY DOMAIN & VMAX     312

DETERMINE SCALED AGGRESSOR VMAX VALUE BY VOLTAGE SCALING WITH VSF TO MAINTAIN APPROPRIATE VOLTAGE RATIO BETWEEN VICTIM AND AGGRESSOR VOLTAGE WIRES     314

PERFORM NIOF ANALYSIS OF VICTIMS AND AGGRESSORS WITH VICTIM NETS AT CV AND AGGRESSORS AT SCALED AGGRESSOR VMAX VALUES WITH MULTIPLE WORST-CASE VICTIM-AGGRESSOR VOLTAGE CONFIGURATIONS IN A SINGLE RUN LEVERAGING NOISE ABSTRACTS CHARACTERIZED AT SINGLE CORNER     316

VERIFY AND FABRICATE INTEGRATED CIRCUIT USING NIOF ANALYSIS RESULTS     318

(56)                    References Cited

U.S. PATENT DOCUMENTS

2012/0254816 A1    10/2012  Brink et al.
2015/0161322 A1     6/2015  Yoshino

OTHER PUBLICATIONS

Ravikishore Gandikota et al., "Viticm Alignment in Crosstalk Aware Timing Analysis," IEEE, Year: 2007, pp. 698-704.
Ravikishore Gandikota et al., "Interconnect Performance Corners Considering Crosstalk Noise," IEEE, Year: 2009, pp. 231-237.
Lauren Hul Chen et al., "Aggressor alignment for worst-case coupling noise." Proceedings of the 2000 international symposium on Physical design. Year: 2000, pp. 48-54.
Kishore K. Duganapalll et al., "Influence of Worst Case Crosstalk Due to Multiple Aggressors on Single Victim in DSM Chips," Proceedings of the Fourth IASTED International Conference Circuits, Signals, and Systems, Dated Nov. 20-22, 2006, pp. 302-307.

100

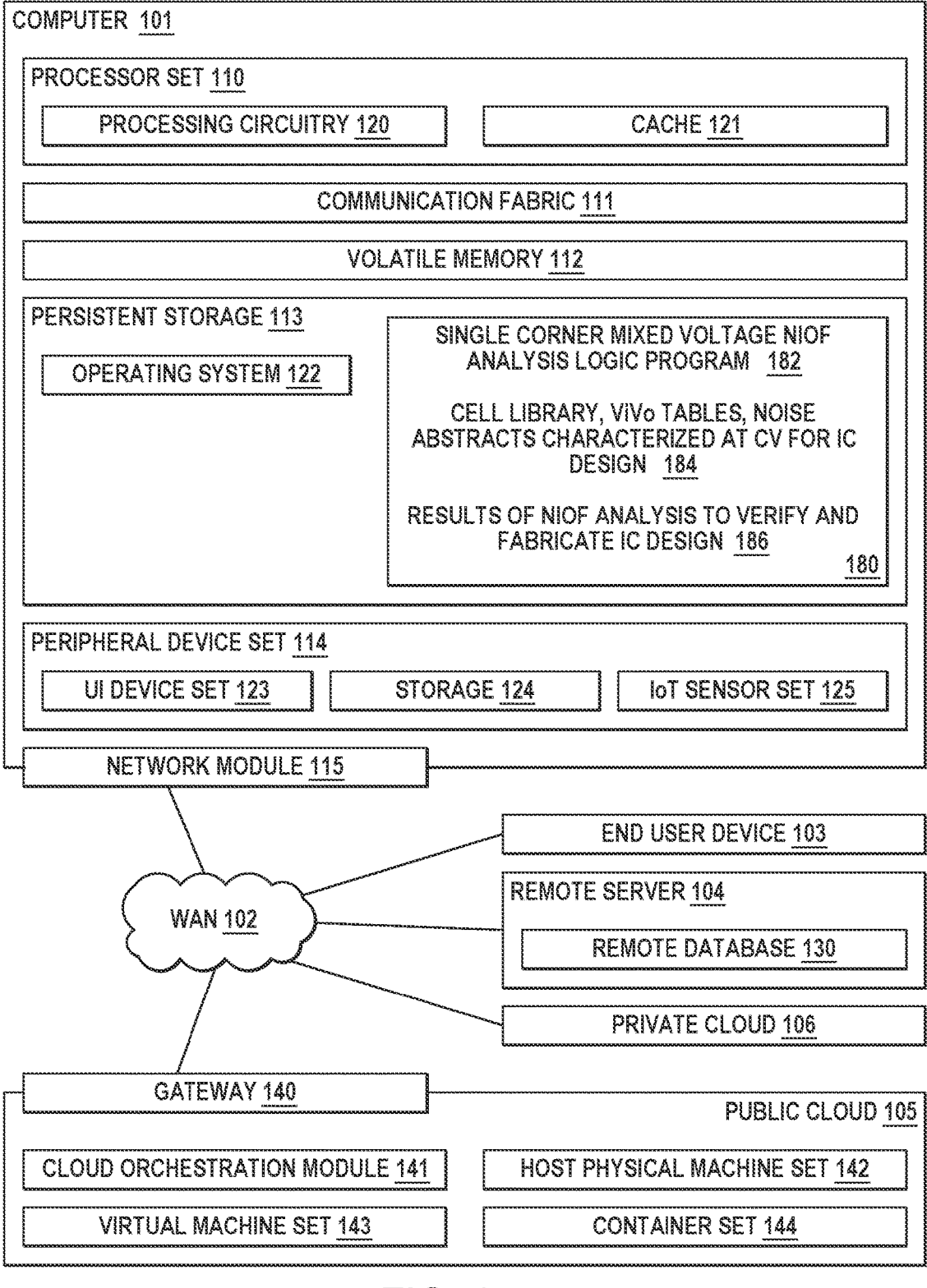

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

SINGLE CORNER MIXED VOLTAGE NIOF ANALYSIS LOGIC PROGRAM 182

CELL LIBRARY, ViVo TABLES, NOISE ABSTRACTS CHARACTERIZED AT CV FOR IC DESIGN 184

RESULTS OF NIOF ANALYSIS TO VERIFY AND FABRICATE IC DESIGN 186

180

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

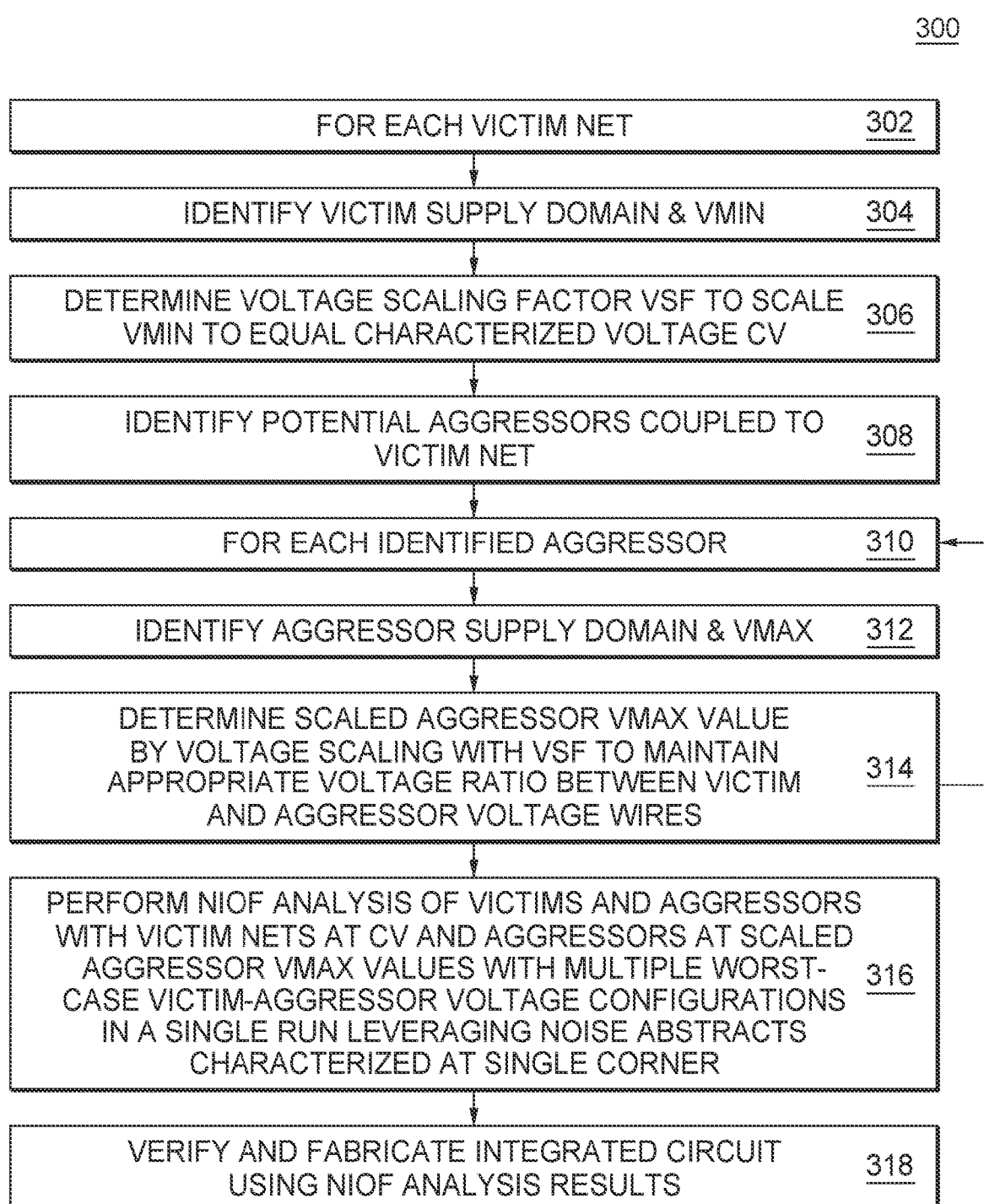

300

FOR EACH VICTIM NET                                        302

IDENTIFY VICTIM SUPPLY DOMAIN & VMIN                       304

DETERMINE VOLTAGE SCALING FACTOR VSF TO SCALE
VMIN TO EQUAL CHARACTERIZED VOLTAGE CV                     306

IDENTIFY POTENTIAL AGGRESSORS COUPLED TO
VICTIM NET                                                 308

FOR EACH IDENTIFIED AGGRESSOR                              310

IDENTIFY AGGRESSOR SUPPLY DOMAIN & VMAX                    312

DETERMINE SCALED AGGRESSOR VMAX VALUE
BY VOLTAGE SCALING WITH VSF TO MAINTAIN
APPROPRIATE VOLTAGE RATIO BETWEEN VICTIM                   314
AND AGGRESSOR VOLTAGE WIRES

PERFORM NIOF ANALYSIS OF VICTIMS AND AGGRESSORS
WITH VICTIM NETS AT CV AND AGGRESSORS AT SCALED
AGGRESSOR VMAX VALUES WITH MULTIPLE WORST-                 316
CASE VICTIM-AGGRESSOR VOLTAGE CONFIGURATIONS
IN A SINGLE RUN LEVERAGING NOISE ABSTRACTS
CHARACTERIZED AT SINGLE CORNER

VERIFY AND FABRICATE INTEGRATED CIRCUIT
USING NIOF ANALYSIS RESULTS                                318

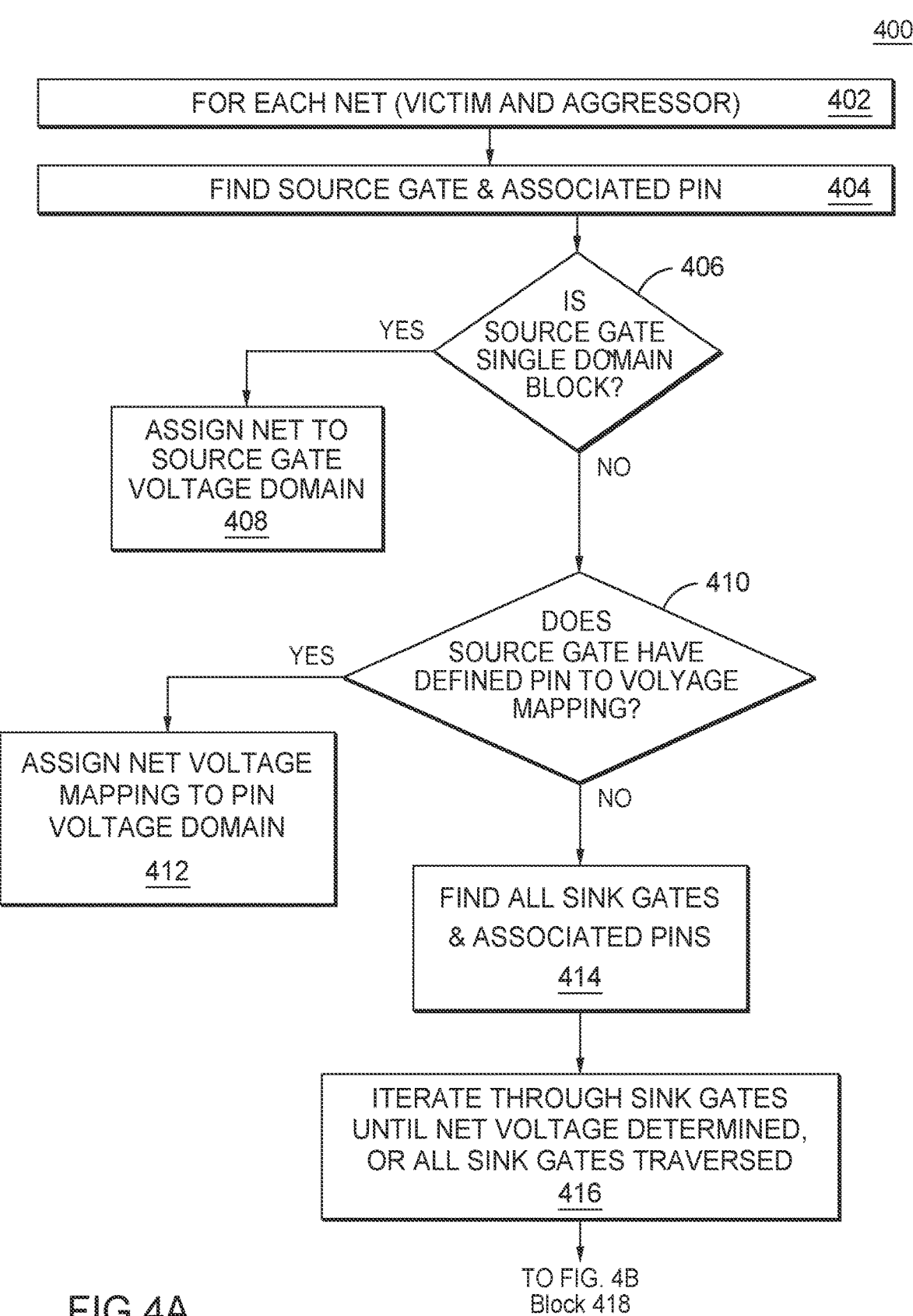

FOR EACH NET (VICTIM AND AGGRESSOR)　　402

FIND SOURCE GATE & ASSOCIATED PIN　　404

IS SOURCE GATE SINGLE DOMAIN BLOCK? 406

YES

ASSIGN NET TO SOURCE GATE VOLTAGE DOMAIN
408

NO

DOES SOURCE GATE HAVE DEFINED PIN TO VOLYAGE MAPPING? 410

YES

ASSIGN NET VOLTAGE MAPPING TO PIN VOLTAGE DOMAIN
412

NO

FIND ALL SINK GATES & ASSOCIATED PINS
414

ITERATE THROUGH SINK GATES UNTIL NET VOLTAGE DETERMINED, OR ALL SINK GATES TRAVERSED
416

TO FIG. 4B
Block 418

| NET | VOLTAGE DOMAIN | SCALED VOLTAGE |
|---|---|---|
| VICTIM 502 | VDD=Vmin | Vmin (VDD) SCALED BY VSF == CV |
| AGGRESSOR 504 | VDD2=Vmax | Vmax (VDD2) SCALED BY VSF |
| BLOCKAGE AGGRESSOR 508 | VDD3=Vblockage-max | Vblk-max (VDD3) SCALED BY VSF |
| UNKNOWN AGGRESSOR 510 | Vunknown-max | Vunknown-max SCALED BY VSF |

FIG. 5

SINGLE CORNER MIXED VOLTAGE NOISE IMPACT ON FUNCTION ANALYSIS

BACKGROUND

The present invention relates to integrated circuits, and more specifically, to noise impact on function (NIOF) analysis for integrated circuit (IC) designs.

NIOF analysis of an IC design is performed to identify noise coupling between a steady-state victim wire or net and switching aggressor nets that could cause functional fails or incorrect switching on the victim net. NIOF analysis is complicated in modern IC designs by mixed voltage conditions with wires or nets in different voltage domains next to each other, such as different voltages or voltage rails VDD1, VDD2, VDD3, etc. and the potential for the actual voltage of the voltage rails to vary across independent voltage ranges based on current processing needs. This creates multiple worst-case voltage conditions depending upon victim and aggressor voltage domains and the voltage domains changing across a range of potential voltage values. NIOF voltage-in voltage-out (ViVo) tables and noise abstracts characterized at the victim operation voltage are required for NIOF modeling of source and sink noise tolerance, propagation and drive strength. For example, using the traditional NIOF process flow with multiple different voltages VDD1, VDD2, VDD3 addressing multiple worst case conditions requires three sets of ViVo tables and noise abstracts characterized at victim operation voltage domains, VDD1, VDD2, VDD3. While characterized libraries at the multiple voltage levels are possible, the library size and standard cell load time are significantly expanded. Further using the traditional NIOF process flow, multiple NIOF analysis runs are required to test each of the different worst case voltage corners, causing significantly increased analysis run time.

SUMMARY

Embodiments of the present disclosure are directed to enhanced noise impact on function (NIOF) analysis of an integrated circuit (IC) design having nets in multiple different variable voltage domains next to each other and including all multiple worst-case victim-aggressor voltage configurations in a single run leveraging noise abstracts characterized at a single voltage corner. A non-limiting example computer-implemented method for performing NIOF analysis for an IC design includes for each victim net, identifying a Victim minimum operating voltage (Victim Vmin) of a supply rail powering gates connected to the victim net, and determining a Victim Scaling Factor (VSF) to scale Victim Vmin to equal a characterized voltage (CV). The computer-implemented method includes for each aggressor net coupled to the victim net, identifying an Aggressor maximum operating voltage (Aggressor Vmax) of power supplies powering gates connected to the aggressor net, scaling the Aggressor Vmax by VSF to a Scaled Aggressor Vmax voltage to maintain a relative voltage ratio between victim and aggressor voltage nets. The NIOF analysis is performed with the victim at the characterized voltage CV and the aggressor nets coupled to the victim net at respective Scaled Aggressor Vmax voltages. The NIOF analysis enables accurately identifying incorrect victim switching or functional fails, effectively and efficiently providing design verification and the ability to sign-off an IC design with a single run. The NIOF analysis enables modifying an integrated circuit design to fix NIOF failures, and fabricating an integrated circuit.

Other disclosed embodiments include a computer system and computer program product for performing NIOF analysis for IC designs implementing features of the above-disclosed method.

BRIEF DESCRIPTION OF THE DRAWINGS

FIG. 1 is a block diagram of an example computer environment for use in conjunction with one or more embodiments of NIOF analysis for an integrated circuit (IC);

FIG. 3 is a flow chart illustrating example operations of one or more embodiments of NIOF analysis for an IC design;

FIGS. 4A and 4B together provide a flow chart illustrating example operations to identify a supply domain for each net including victims and aggressors in an IC design of one or more embodiments of NIOF analysis; and FIG. 5 illustrate an example table of victim and aggressor voltages of one or more embodiments of NIOF analysis for an integrated circuit.

DETAILED DESCRIPTION

Figure 2:
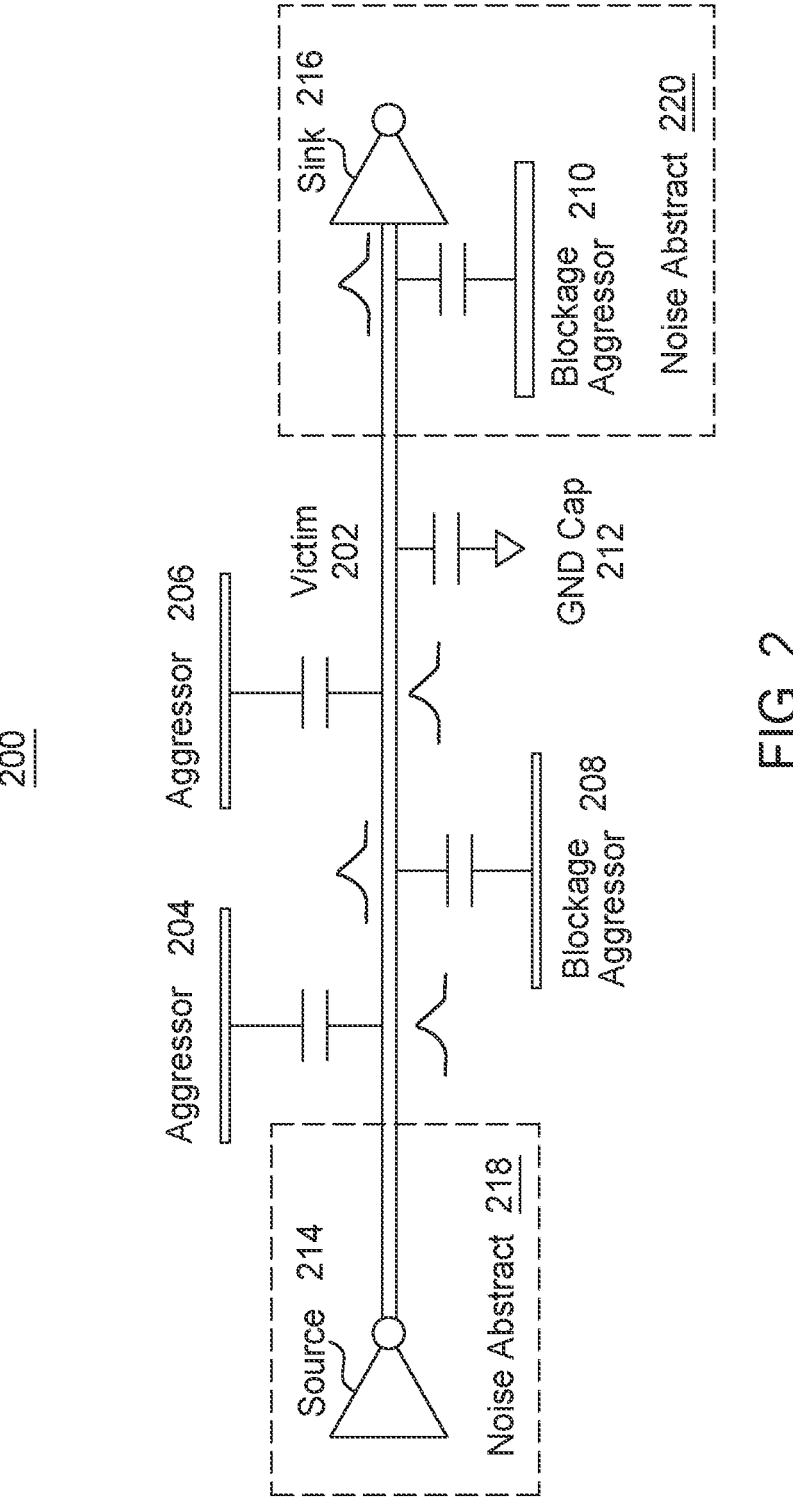
FIG. 2 is a block and schematic diagram illustrating example components of a circuit of one or more embodiments of NIOF analysis of an IC design.

The descriptions of the various embodiments of the present invention are presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In accordance with features of one or more disclosed embodiments, improved computer system performance for NIOF analysis is enabled for an IC design having nets in multiple different variable voltage domains next to each other. Conventional NIOF process flows for an IC design for different variable voltage domains and multiple worst-case voltage conditions greatly expands the library size required for storing multiple sets noise abstracts for multiple voltage levels and greatly expands required cell load time and requires multiple runs to be able to test each of the different worst case voltage corners. Features of embodiments disclosed enable enhanced NIOF analysis that is efficiently and effectively implemented with reduced memory requirements and reduced run time over conventional NIOF analysis.

In accordance with features of embodiments of the disclosure, computing system operations for NIOF analysis minimize required memory for storing NIOF ViVo tables and noise abstracts and other possible types of NIOF characterized or modeling files, and reduce system power requirements over traditional flow, with faster run time enabled. ViVo tables and noise abstracts, and other types of NIOF modeling files are characterized at a selected voltage level enabling enhanced NIOF modeling of source and sink noise tolerance, propagation and drive strength. Advantages of embodiments of the disclosure enable improved computer system performance for NIOF analysis, accurately identifying incorrect victim switching or functional fails, effectively and efficiently providing design verification and the ability to sign-off an IC design with a single run, and enable modifying an integrated circuit design to fix NIOF failures, and fabricating an integrated circuit.

With reference now to FIG. 1, there is shown an example computing environment 100. Computing environment 100 contains an example of an environment for the execution of at least some of the computer code involved in performing the inventive methods at block 180 for performing NIOF analysis for an IC design, such as a single corner mixed voltage NIOF analysis logic program 182, a cell library, ViVo tables and noise abstracts 184 characterized at a single characterized voltage (CV) 184 and NIOF results to verify and fabricate an IC design 186. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In accordance with features of embodiments of the disclosure, the single corner mixed voltage NIOF analysis logic 182 together with the cell library, ViVo tables and noise abstracts 184 and the NIOF results 186 enable enhanced NIOF analysis, accurately and efficiently modeling all worst-case voltage configurations in a single run, identifying incorrect victim switching or functional fails, and providing design verification including the ability to sign-off an IC design with a single corner analysis.

Referring to FIG. 2, a circuit 200 provides an example wire or net model illustrating example circuit components for NIOF analysis of an IC design in accordance with one or more disclosed embodiments. Circuit 200 includes a victim wire or net 202 and associated with the victim net 202, a plurality of aggressor nets or aggressor nets 204, 206, 208, 210 and a ground GND capacitance 212 representing coupling capacitance between the nets. The victim net 202 includes a source 214 and a sink 216 connected by a victim net, where the source 214 and sink 216 represent various logic gates, or inverters as shown. The aggressor nets 204, 206, 208, 210 also include a source and a sink (not shown) connected by an aggressor net.

Noise coupling by the aggressor nets 204, 206, 208, 210 to the victim net 202 (due to capacitance coupling) is represented by respective waveforms shown adjacent the victim net 202. NIOF analysis of one or more disclosed embodiments, identifies possible noise coupling between a steady-state victim net 202 and switching aggressor nets 204, 206, 208, 210 that could cause incorrect switching on the victim net or functional fails. As shown, aggressor nets 208, 210 represent blockage aggressor nets that are outside a visible boundary of the IC design being modeled that are analyzed using an artificial boundary for circuit 200 and are assigned to a worst-case voltage of all design voltage domains for the circuit 200. A single voltage corner characterization at the voltage CV is used to generate a noise abstract 218 for the victim source 214 and a noise abstract 220 for victim sink 216 in circuit 200.

In accordance with one or more disclosed embodiments, NIOF analysis is performed for multiple worst-case victim-aggressor voltage configurations in a single run leveraging noise abstracts characterized at a single voltage corner. A minimum operating voltage connected to each victim net, such as victim net 202 in the IC design, is identified and a scaling factor is determined to scale the victim minimum voltage to a single characterized voltage CV. The single voltage CV used for the IC design is selected based on the different voltage domains in the IC design and is used for NIOF analysis of the victim nets. A single voltage corner characterization for the standard cell library for all gates and macros in the IC design, such as the illustrated inverters source 214 and sink 216, is generated at the single characterized voltage CV. All NIOF ViVo tables and noise abstracts 184 for the IC design, such as shown in circuit 200 and stored in block 180 of computer 101 are characterized at the victim operation voltage equal to the single characterized voltage CV for effective NIOF modeling source and sink noise tolerance, propagation and drive strength.

In accordance with one or more disclosed embodiments, the NIOF analysis is performed for each of the aggressor nets capacitively coupled to the victim net, such as the illustrated aggressor nets 204, 206, 208, 210 with a maximum aggressor voltage scaled to respective appropriate Scaled Aggressor Vmax values. A NIOF analysis of all victim nets 202 in the IC design can be performed in a single run including all multiple worst-case victim-aggressor voltage configurations leveraging noise abstracts, such as noise abstracts 218, 220 characterized at a single voltage corner. Performing the NIOF analysis in accordance with one or more disclosed embodiments enables accurate analysis of noise impacts on victim nets with aggressors at different voltage levels and enables correctly identifying NIOF failures and design verification. Results of the NIOF analysis in accordance with one or more disclosed embodiments advantageously are used to verify an IC design, and are used to make design changes to fix NIOF problems and fabricate an IC design.

Referring to FIG. 3, there is shown a flow chart illustrating example operations of a computer-implemented method 300 of one or more disclosed embodiments of NIOF analysis for an IC design. Method 300 may be implemented with computer 101 for example, with operations of method 300 included in the single corner mixed voltage NIOF analysis logic 182, and used together with the cell library, ViVo tables and noise abstracts 184 using single corner characterization at the single characterized voltage (CV) and NIOF analysis results 148. Method 300 is performed for NIOF analysis of an IC design, such as circuit 200 of FIG. 2, and for various complex integrated circuit designs with multiple different voltage domains including, for example, microprocessors, and application-specific integrated circuits (ASICs).

As shown in FIG. 3, method 300 begins at a block 302 with NIOF analysis logic 182 of computer 101 identifying each victim net in the IC design. Each voltage domain has a minimum and maximum allowed operating voltage (Vmin and Vmax), which can be the same voltage value in some cases. At block 304 NIOF analysis logic 182 identifies for the victim net, a victim supply domain and a minimum operating voltage Vmin of the associated victim supply domain for the supply rail powering gates connected to victim net using the stored cell library, ViVo tables and noise abstracts 184 of computer system memory 106. At block 304 the victim net is set to the minimum operating voltage value (Victim Vmin).

The cell library, ViVo tables and noise abstracts 184 are generated at a characterized voltage CV and stored in block 180. The cell library, ViVo tables and noise abstracts 184 typically are characterized at the victim operation voltage. Using the voltage CV to pre-characterize the cell library, ViVo tables and noise abstracts 184 provides an effective basis for scaling victim-aggressor voltages to enable modeling multiple worst-case victim-aggressor voltage configurations with multiple different voltage domains.

As shown at block 306 NIOF analysis logic 182 determines a VSF to scale Victim Vmin of the victim net to the characterized equal CV, (in this case VSF=CV/Victim Vmin). In one embodiment, the identified scaling factor VSF is used to scale a maximum operating voltage of each aggressor net having a noise impact on the victim net to maintain an appropriate voltage ratio between the scaled victim and aggressor voltages.

It should be understood that embodiments of the disclosure are not limited to the illustrated example shown at block 306 where VSF is set equal CV/Victim Vmin. In other embodiments, the scaling factor VSF may implemented with a non-linear function design. For example at block 306, a scaling factor VSF identified by a non-linear function design may be used to adjust the minimum operating voltage value Victim Vmin toward the characterized voltage CV.

The victim and aggressor voltage ratio provided by VSF enables effectively modeling multiple worst-case victim-aggressor voltage configurations at the single voltage corner CV. Using traditional NIOF flows, addressing multiple worst case conditions requires multiple sets of noise abstracts respectively characterized at the multiple different voltage domains in the IC design. Operations of method 300 performed by the single corner mixed voltage NIOF analysis logic 182, uses the cell library, ViVo tables and noise abstracts 184 generated by voltage corner characterization at the characterized voltage CV, avoiding the need for multiple sets of noise abstracts respectively characterized the multiple different voltage domains of traditional flow processes. NIOF analysis logic 182 performs method 300 using the pre-characterized ViVo tables and noise abstracts 184 at CV, avoids the need for the expanded library size and expanded cell load time required for traditional NIOF flows.

Each potential aggressor net having possible noise impact on the victim net is identified at block 308. NIOF analysis logic 182 performs method 300 at block 310 completing the operations at blocks 312 and 314 for each aggressor net. At block 312, an aggressor supply domain is identified from aggressor nets powering gates connected to the aggressor net and then a maximum voltage Vmax for the aggressor net is identified from the voltage range of the associated aggressor supply domain. At block 312, the aggressor net is set to the identified maximum voltage (Aggressor Vmax). As shown at block 314, a Scaled Aggressor Vmax value is determined by scaling the Aggressor Vmax value by VSF to provide the voltage used in actual simulation and maintain a relative voltage ratio between the victim and aggressor nets. In one embodiment, In one embodiment, where the VSF for victim and aggressor can be both linear and identical to ensure balanced voltage scaling for both types of nets. In other embodiments, the VSF scaling function can be non-linear, or can be designed to scale victim and aggressor nets to different relative voltages. One example includes modifying the aggressor's VSF scaling by some additional incremental voltage value in order to add additional pessimism to the model by artificially increasing the aggressor voltage to be higher than the victim's voltage. In this example the aggressor's VSF might look like this VSF=CV/Victim Vmin+Vpessimism-modifier.

NIOF analysis logic 182 performs NIOF analysis of each victim net with the victim net at voltage CV and the aggressor nets at their respective scaled Aggressor Vmax voltage values at block 316. For example, in FIG. 5, an example table 500 is shown with example victim and aggressor voltage domains and scaled voltages. In FIG. 5, a scaled voltage for a victim net 502 is set to the voltage CV by scaling the minimum victim voltage VDD by VSF and for aggressors 504, 508, 510, VSF is used to scale the illustrated respective maximum voltages VDD2, VDD3, Vunknown−max of the aggressors.

Using VSF to scale the minimum operating voltage of the victim net and the maximum operating voltage of respective aggressor nets of method 300 maintains a relative voltage ratio between the victim and aggressor nets, and enables performing NIOF analysis of each victim net in a single run with multiple worst-case victim-aggressor voltage configurations, leveraging noise abstracts characterized at the characterized voltage CV.

At block 316, NIOF analysis logic 182 performs NIOF analysis of the victim net at the relative voltage CV and the aggressor nets having a noise impact on the victim net at the scaled Aggressor Vmax values. NIOF analysis logic 182 effectively identifies NIOF failures at block 316.

At block 316, NIOF analysis logic 182 performs NIOF analysis for each victim net and identified aggressor nets to the victim net in the IC design. In one run of method 300 at block 316, a first net is identified as a victim, and nearby nets having possible noise impact on the victim net are identified as aggressors. In another run of method 300, an aggressor net to the first victim net can be identified as a next victim, and the first victim net becomes an aggressor net to the identified next victim net. That is, the method 300 can be performed or re-run for each net including identified victim nets and aggressor nets in the IC design. At block 318, NIOF analysis logic 182 uses identified NIOF failures results at block 316 to verify an integrated circuit design and to make design changes to fix NIOF problems and fabricate an integrated circuit.

Method 300 provides accurate NIOF analysis of noise impacts on victim nets with aggressors at multiple different voltage levels, accurately identifying NIOF failures. NIOF analysis performed at block 316 enables a single run for signing off the IC design, enabling design verification without adding excessive pessimism defining nets as the worst possible voltage differentials and without characterizing noise abstracts at multiple different voltage corners.

Figure 4B:
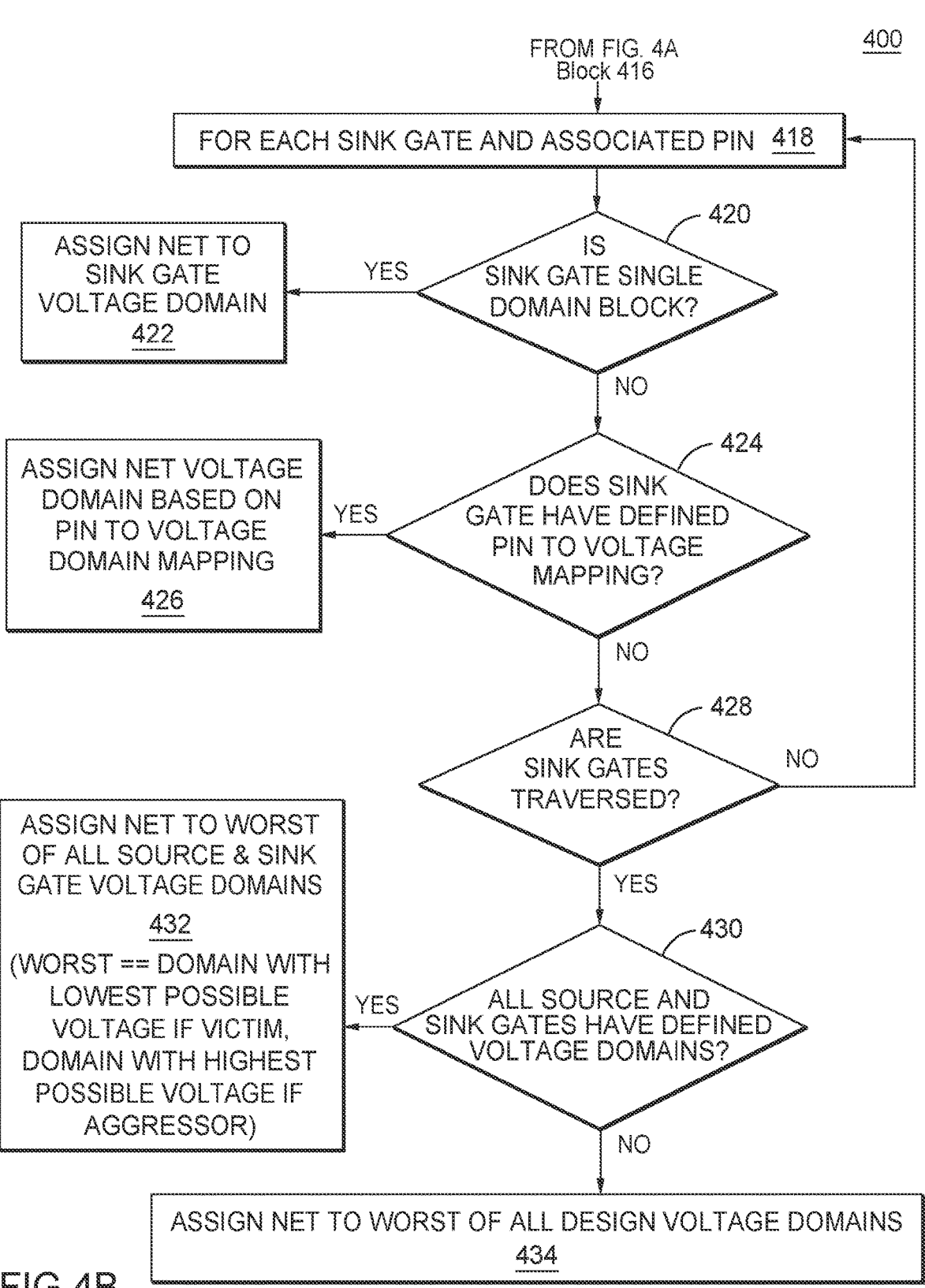

FIGS. 4A and 4B together show a flow chart illustrating example operations of a computer-implemented method 400 to identify a supply domain for each net including victims and aggressors in the IC design, as shown at blocks 304, 312 in FIG. 3 of method operations in method 300. With multiple wiring layers and multiple voltage domains in a circuit design, identifying a voltage domain for a net can be challenging. As shown in FIG. 4A, method 400 begins at a block 402 with NIOF analysis logic 182 identifying for each net, victim nets and potential aggressor nets to the victim net in the IC design. At block 404, NIOF analysis logic 182 performs checking to find a source gate and associated pin for the net. Then NIOF analysis logic 182 determines if the source gate is a single voltage domain block at decision block 406. When a single voltage domain block is identified for the source gate, the net is assigned to the source gate voltage domain at block 408.

Otherwise, for multiple voltage domains or situations where the source gate's voltage is unknown, NIOF analysis logic 182 performs checking to determine if the source gate has a defined pin to voltage domain mapping using the stored cell library 184 at decision block 410. If yes, NIOF analysis logic 182 assigns the net voltage based upon pin to voltage domain mapping at block 412.

Without pin to voltage domain mapping, NIOF analysis logic 182 performs checking to identify all sink gates and associated pins for the nets at block 414 and, as shown at block 416 NIOF analysis logic 182 iterates through the sink gates until the net voltage is determined or all sink gates are traversed. Operations of method 400 at block 416 are accomplished for example by operations described with respect to blocks 418-428 shown in FIG. 4B.

Referring to FIG. 4B, at block 418 method 400 identifies each sink gate and associated pin. NIOF analysis logic 182 determines if the sink gate is a single voltage domain block at decision block 420. When NIOF analysis logic 182 identifies a single domain block for the sink gate, the net is assigned to the sink gate voltage domain at block 422. Otherwise, for multiple voltage domain blocks, NIOF analysis logic 182 performs checking to determine if the sink gate has a defined pin to voltage mapping at decision block 424. If yes, the net voltage domain is assigned based upon the pin to voltage domain mapping at block 426. Without pin to voltage domain mapping, NIOF analysis logic 182 performs checking to determine if all sink gates are traversed at decision block 428. If all sink gates have not been traversed operations return to block 418 and continue. Without pin to voltage domain mapping, an aggressor net voltage domain cannot be definitively assigned and more sink gates must be checked. When all sink gates have been traversed, NIOF analysis logic 182 performs checking to determine whether all source and sink gates and associated pins have a defined voltage domain at decision block 430. If yes, at block 432 NIOF analysis logic 182 assigns the net to the worst of all source and sink gate voltage domains, where the worst voltage domain (identified as the domain with the lowest possible minimum voltage of all observed voltage domains) is assigned to a victim net, and the worst voltage domain (identified at the domain with the highest possible maximum voltage) is assigned to an aggressor net. For any nets where one or more source or sink gates and associated pins do not having a defined voltage domain, the net is identified as being in an undefined voltage domain at block 434. The undefined voltage domain is designed to assign the worst of all possible design voltage domains to the victim and or aggressor net.

FIG. 5 illustrates an example table 500 of example victim and aggressor voltage domains and scaled voltages in accordance with one or more disclosed embodiments of NIOF analysis for an integrated circuit design. As shown, a victim net 502 has a voltage domain VDD, and because it is a victim wire, we have assigned it the minimum allowed VDD voltage value which we refer to as Victim Vmin. The minimum voltage Victim Vmin for victim 502 is scaled by VSF to equal CV. An aggressor net 504 has an example voltage domain VDD2, and because it is an aggressor net, we assign it the maximum allowed VDD2 voltage value which we refer to as Vmax. The scaled voltage for aggressor net 504 is VDD2 scaled by VSF. A blockage aggressor net 508 has an example voltage domain VDD3 equal to a maximum blockage voltage Vblk-max. The scaled voltage for aggressor net 508 is VDD3 scaled by VSF. An undefined or unknown aggressor net 510, for example outside the IC design or with source/sink gates with unknown voltage domain pin mappings, has an example maximum unknown voltage Vunknown–max. The scaled voltage for aggressor net 510 is Vunknown–max scaled by VSF. Table 500 illustrates example victim net 502 scaled to the voltage CV, and the aggressor voltages VDD2, VDD3, Vunknown–max are scaled by VSF to maintain an appropriate voltage ratio between victim and aggressor voltage nets.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing noise impact on function (NIOF) analysis for an integrated circuit design, the method comprising:
identifying a victim net in the design,
identifying a Victim minimum operating voltage (Victim Vmin) of a supply rail powering gates connected to the victim net;
determining a Victim Scaling Factor (VSF) to scale said identified Victim Vmin relative to a characterized voltage (CV);
identifying an aggressor net having a noise impact on the victim net;
identifying an Aggressor maximum operating voltage (Aggressor Vmax) of power supplies powering gates connected to the aggressor net;
scaling said identified Aggressor Vmax by VSF with a Vpessimism-modifier to provide a Scaled Aggressor Vmax value to maintain a relative voltage ratio between said victim and aggressor nets; and
performing NIOF analysis for the victim net at said relative voltage CV value and the aggressor net at the Scaled Aggressor Vmax value to identify an NIOF failure.

2. The method of claim 1, wherein performing NIOF analysis further comprising
modifying an integrated circuit design to fix NIOF failures, verifying and fabricating an integrated circuit.

3. The method of claim 1, wherein determining a Victim Scaling Factor (VSF) to scale said identified Victim Vmin relative to a characterized voltage CV further comprises applying a non-linear scaling function VSF to scale said identified Victim Vmin toward said characterized voltage CV.

4. The method of claim 1, wherein determining a Victim Scaling Factor (VSF) to scale said identified Victim Vmin relative to a characterized voltage CV further comprises applying a linear scaling function to scale said identified Victim Vmin equal to said characterized voltage CV.

5. The method of claim 1, wherein scaling said identified Aggressor Vmax by VSF with a Vpessimism-modifier to provide a Scaled Aggressor Vmax value to maintain a relative voltage ratio between said victim and aggressor nets further comprises selecting said Vpessimism-modifier value to add a pessimism voltage to the Scaled Aggressor Vmax value.

6. The method of claim 1, wherein identifying said Victim Vmin and identifying said Aggressor Vmax further comprises identifying a voltage domain of the net including the victim net and the aggressor net, identifying a list of gates and macros for the nets and identifying associated voltage supply domains for said identified list of gates and macros.

7. The method of claim 6, further comprises based upon identifying a blockage aggressor net, assigning a worst voltage domain with a highest possible voltage for the blockage aggressor net.

8. The method of claim 6, based upon a failure to identify a voltage domain, assigning a worst voltage domain with a minimum possible voltage domain for the victim net and assigning a worst voltage domain with a highest possible voltage for the aggressor net.

9. The method of claim 1, further comprising:
using a single voltage corner characterization for a cell library of the integrated circuit design at said characterized voltage CV.

10. The method of claim 1, wherein performing NIOF analysis comprises using multiple worst-case voltage configurations in a single run leveraging noise abstracts characterized at said characterized voltage CV.

11. A system, comprising:
a processor; and
a memory, wherein the memory includes a computer program product configured to perform noise impact on function (NIOF) analysis for an integrated circuit design, the operations comprising:
identifying a victim net in the design,
identifying a Victim minimum operating voltage (Victim Vmin) of a supply rail powering gates connected to the victim net;
determining a Victim Scaling Factor (VSF) to scale said identified Victim Vmin relative to a characterized voltage (CV);
identifying an aggressor net having a noise impact on the victim net;
identifying an Aggressor maximum operating voltage (Aggressor Vmax) of power supplies powering gates connected to the aggressor net;
scaling said identified Aggressor Vmax by VSF with a Vpessimism-modifier to provide a Scaled Aggressor Vmax value to maintain a relative voltage ratio between said victim and aggressor nets; and
performing NIOF analysis for the victim net at said relative characterized voltage CV and the aggressor net at the Scaled Aggressor Vmax value to identify an NIOF failure.

12. The system of claim 11, wherein performing NIOF analysis further comprising:
verifying the integrated circuit design and fabricating an integrated circuit.

13. The system of claim 11, wherein performing NIOF analysis further comprising:
modifying the integrated circuit design to fix NIOF failures and fabricating an integrated circuit.

14. The system of claim 11, further comprising:
performing operations characterizing a cell library for the integrated circuit design at a single voltage corner.

15. The system of claim 11, wherein identifying said Victim Vmin and identifying said Aggressor Vmax further comprises identifying a voltage domain of the net including the victim net and the aggressor nets, identifying a list of gates and macros for the nets and identifying associated voltage supply domains for said identified list of gates and macros.

16. A computer program product for performing noise impact on function (NIOF) analysis for an integrated circuit design, the computer program product comprising:
a non-transitory computer-readable storage medium having computer-readable program code embodied therewith, the computer-readable program code executable by one or more computer processors to perform an operation comprising:
identifying a victim net in the design,
identifying a Victim minimum operating voltage (Victim Vmin) of a supply rail powering gates connected to the victim net;
determining a Victim Scaling Factor (VSF) to scale said identified Victim Vmin relative to a characterized voltage (CV);
identifying an aggressor net having a noise impact on the victim net;
identifying an Aggressor maximum operating voltage (Aggressor Vmax) of power supplies powering gates connected to the aggressor net;
scaling said identified Aggressor Vmax by VSF with a Vpessimism-modifier to provide a Scaled Aggressor Vmax value to maintain a relative voltage ratio between said victim and aggressor nets; and
performing NIOF analysis for the victim net at said relative characterized voltage CV and the aggressor net at the Scaled Aggressor Vmax value to identify an NIOF failure.

17. The computer program product of claim 16, wherein performing NIOF analysis further comprising:
modifying an integrated circuit design to fix NIOF failures, verifying and fabricating an integrated circuit.

18. The computer program product of claim 16, wherein the computer-readable program code is further executable to:
perform operations characterizing a cell library for the integrated circuit design at a single voltage corner.

19. The computer program product of claim 16, wherein for the victim nets in the IC design, noise abstracts for gates and macros are characterized at a single voltage corner equal to said characterized voltage CV.

20. The computer program product of claim 16, wherein identifying said Victim Vmin and identifying said Aggressor Vmax further comprises identifying a voltage domain of the net including the victim net and the aggressor nets, identifying a list of gates and macros for the nets and identifying associated voltage supply domains for said identified list of gates and macros.

* * * * *